(12) United States Patent
Rönneke et al.

(10) Patent No.: US 9,723,511 B2
(45) Date of Patent: Aug. 1, 2017

(54) NODE AND METHOD FOR BUFFERING DOWNLINK DATA

(71) Applicant: TELEFONAKTIEBOLAGET L M ERICSSON (PUBL), Stockholm (SE)

(72) Inventors: Hans Rönneke, Kungsbacka (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/655,008

(22) PCT Filed: Jun. 16, 2015

(86) PCT No.: PCT/EP2015/063483
§ 371 (c)(1),
(2) Date: Jun. 23, 2015

(87) PCT Pub. No.: WO2015/197431
PCT Pub. Date: Dec. 30, 2015

(65) Prior Publication Data
US 2016/0262041 A1 Sep. 8, 2016

Related U.S. Application Data

(60) Provisional application No. 62/016,695, filed on Jun. 25, 2014.

(51) Int. Cl.
*H04W 28/02* (2009.01)
*H04W 52/02* (2009.01)
(Continued)

(52) U.S. Cl.
CPC ......... *H04W 28/0221* (2013.01); *H04L 47/14* (2013.01); *H04L 49/90* (2013.01);
(Continued)

(58) Field of Classification Search
CPC ............. H04W 68/005; H04W 76/048; H04W 76/045; H04W 76/068; H04W 52/0216
See application file for complete search history.

(56) References Cited

U.S. PATENT DOCUMENTS

2015/0003312 A1* 1/2015 Jeong ................ H04W 52/0209
370/311
2015/0117285 A1* 4/2015 Xie .................... H04W 52/0216
370/311
(Continued)

FOREIGN PATENT DOCUMENTS

WO 2013119021 A1 8/2013

OTHER PUBLICATIONS

International Search Report and the Written Opinion of the International Searching Authority dated Sep. 16, 2015, in International Application No. PCT/EP2015/063483, 10 pages.
(Continued)

*Primary Examiner* — Jung Park
(74) *Attorney, Agent, or Firm* — Rothwell, Figg, Ernst & Manbeck, P.C.

(57) ABSTRACT

Example embodiments presented herein are directed towards a mobility management node and SGW or Gn/Gp-SGSN, and corresponding methods therein, for downlink data buffering in a wireless communications network. Such buffering is useful when the wireless device is in a power saving state e.g. PSM or eDRX. Thus, since the downlink data is buffered, there is no longer a need for multiple Downlink Data Notifications to be sent.

12 Claims, 10 Drawing Sheets

(51) Int. Cl.
*H04L 12/801* (2013.01)
*H04L 12/861* (2013.01)
*H04W 72/04* (2009.01)
*H04W 76/04* (2009.01)

(52) U.S. Cl.
CPC ... *H04W 52/0209* (2013.01); *H04W 52/0212* (2013.01); *H04W 52/0216* (2013.01); *H04W 72/042* (2013.01); *H04W 76/048* (2013.01); *Y02B 60/50* (2013.01)

(56) References Cited

U.S. PATENT DOCUMENTS

2015/0139054 A1\* 5/2015 Wu ................... H04W 52/0225
370/311
2016/0021639 A1\* 1/2016 Ma .................... H04W 52/0216
455/458

OTHER PUBLICATIONS

3GPP, 3rd Generation Partnership Project; Technical Specification Group Services and System Aspects; General Packet Radio Service (GPRS); Service description; Stage 2 (Release 12), 3GPP TS 23.060 V12.3.0, 2013, 344 pages.

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.3.0, 2013, 302 pages.

3GPP, 3rd Generation Partnership Project; Technical Specification Group Services and System Aspects; Study on Machine-Type Communications (MTC) and other mobile data applications communications enhancements (Release 12), 3GPP TR 23.887 V12.0.0, 2013, 151 pages.

\* cited by examiner

NODE AND METHOD FOR BUFFERING DOWNLINK DATA

RELATED APPLICATIONS

This application is a 35 U.S.C. §371 National Phase Entry Application from PCT/EP2015/063483, filed Jun. 16, 2015, designating the United States, and also claims the benefit of U.S. Provisional Application No. 62/016,695, filed Jun. 25, 2014. The disclosures of both applications are incorporated herein in their entirety by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be M2M devices, Internet-of-Things devices, mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "Bnode" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In order to transmit/receive data to/from a mobile terminal such as a UE, the UE needs to have an established RRC connection. When in RRC connected mode, the UE may operate in different communication states. In 3GPP, these communication states are referred to as RRC states. Inactivity for a certain time in a connected state, which is determined by a timer, generally results in transition to a less resource consuming state, while activity results in transition to a higher state in which more resources are required by the UE and the RAN. An example of a less resource consuming state is an idle mode and an even less resource consuming state is a sleep mode also known as power saving state. A device in a sleep mode may be employing power saving methods such as Extended long DRX in idle mode, Extended long DRX in connected mode or Power Saving Mode (PSM).

SUMMARY

There is a problem of sending downlink data, for example, Mobile Terminated (MT) data in the form of IP packets, to a device attached to a 3GPP network when the device uses power saving methods such as the Power Saving Mode (PSM), as defined in 3GPP TS 23.401 clause 4.3.22, or Extended long DRX in idle mode as proposed in TR 23.887 clause 7.1.3.1 or Extended long DRX in connected mode as proposed in TR 23.887 clause 7.1.3.6. The problem is that the current 3GPP specification states that downlink data packets arriving in the SGW shall be discarded if the device is using PSM (see TS 23.401 clause 4.3.5.2). With the PPF clear, the MME does not page the UE in E-UTRAN coverage and shall send a Downlink Data Notification Reject message to the SGW when receiving a Downlink Data Notification message from the SGW. A rejected DDN means that the SGW will discard the buffered packed (see TS 23.401, clause 5.3.4.3). A similar behavior can be expected for the Extended long DRX proposals. It should be appreciated that a device may stay in a power saving state for anything from a few seconds up to several days.

Thus, at least one example object of the example embodiments presented herein is to provide an efficient means of providing downlink data to a wireless device in a sleep mode and/or power saving state. The example embodiments presented herein provide downlink data buffering management in which the buffering of a downlink data may be extended in a SGW or a Gn/Gp-SGSN until the wireless device exits the power saving state. Thus, the SGW or Gn/Gp-SGSN does not need to continuously send DDN for the downlink data. Once the wireless device exits the power saving state and connects to the network, for example, at a Tracking Area Update or Routing Area Update or as a result of a deferred paging, any data buffered in the SGW or the Gn/Gp-SGSN can be sent to the wireless device. Thus, the example embodiments presented herein enables very resource efficient communication for a group of IoT devices that uses downlink communication, i.e. communication from the application server on the network side to the device.

At least one example advantage of some of the example embodiments presented herein is only a minimum of signaling is required in the network when downlink data shall be sent to a wireless device in a power saving state. A further example advantage is that the application server in the network does not need to use any Tsp interface for device triggering, it does not need to have access to any information where the device has announced its availability times. Yet another example advantage is that the network may change the DRX time dynamically without the application in the device having to publish that to a resource is reachable by the application server.

Another example advantage is that the device may be paged by the mobility management node, for example a MME, SGSN or S4-SGSN, immediately when it becomes available with no delay, for example, caused by handling in other nodes such as for device triggering. The mobility management node may even piggy-back a page indication in the TAU Accept message sent to the device.

Yet another example advantage is that it is easy and simple for an application server to reach a 3GPP device even if it uses power saving methods. Only IP connectivity to the device is required. No agreement with the operator is required for access of a support interface, for example, the Tsp interface for device triggering as of 3GPP TS 23.682. Just send a DL packet to the device and wait. If retransmission still is used, the scheme may be adjusted and a less aggressive retransmission scheme may be used. Optionally an ICMP packet may be received making it clear that the sent packet will be delivered but with an extended latency time.

A further example advantage is that it is easy and simple for application programmers. Only the IP connection to the device needs to be considered. Unified and the same as for other non-3GPP accesses, for example, fixed, WiFi etc. A further example advantage is minimum usage of core network resources as less aggressive repetition schemes can be used by applications. Yet another example advantage is minimum usage of radio resources as polling of the application server is not required.

Accordingly, some of the example embodiments are directed towards a method, in a mobility management node, for downlink data buffering in a wireless communications network. The method comprises receiving, from a SGW, a DDN for a downlink data packet for a wireless device in an idle mode. The method further comprises determining if the wireless device is also in a power saving state. If the wireless device is in a power saving state, the method further comprises sending, to the SGW, a DDN Acknowledge with a cause code or flag indicating that the downlink data packet is to be buffered in memory. A time value may be included when the mobility management node estimates the time the device will be reached. If such a value is included, the time value may serve as an indication itself, for example, in addition to or instead of the cause code or flag.

Some of the example embodiments are directed towards a mobility management node for downlink data buffering in a wireless communications network. The mobility management node comprises a receiver configured to receive, from a SGW, a DDN for a downlink data packet for a wireless device in an idle mode. The mobility management node further comprises processing circuitry configured to determine if the wireless device is also in a power saving state. The mobility management node also comprises a transmitter. If the wireless device is in a power saving state, the transmitter is configured to send, to the SGW, a DDN Acknowledge with a cause code or flag indicating that the downlink data is to be buffered in memory.

Some of the example embodiments are directed towards a method, in a SGW or a Gn/Gp-SGSN for downlink data buffering in a wireless communications network. The method comprises sending, to a mobility management node, a DDN for a downlink data packet for a wireless device in an idle mode. The method further comprises receiving, from the mobility management node, a DDN Acknowledgement comprising a flag or cause code or time indicating the downlink data is to be buffered in memory. The method also comprises buffering the downlink data packet within the SGW or Gn/Gp-SGSN until a connection has been established to the wireless device for the downlink data packet to be delivered to the wireless device.

Some of the example embodiments are directed towards a SGW or a Gn/Gp-SGSN for downlink data buffering in a wireless communications network. The SGW or Gn/Gp-SGSN comprises a transmitter configured to send, to a mobility management node, a DDN for a downlink data packet for a wireless device in an idle mode. The SGW or Gn/Gp-SGSN further comprises a receiver configured to receive, from the mobility management node, a DDN Acknowledgement comprising a flag or cause code or time indicating the downlink data packet is to be buffered in memory. The SGW or SGSN also comprises processing circuitry configured to buffer the downlink data packet within the SGW or SGSN until the connection with the wireless device has been established for the downlink data packet to be delivered to the wireless device.

DEFINITIONS

3GPP Third Generation Partnership Project
AS Application Server
BSC Base Station Controller
CPU Control Processing Unit
DDN Downlink Data Notification
DL Downlink
DNS Domain Name System
DRX Discontinuous Reception
E-UTRAN Evolved Universal Terrestrial Radio Access Network
eNodeB Evolved NodeB
EPC Evolved Packet Core
FIFO First In First Out
GERAN GSM/EDGE Radio Access Network
GGSN Gateway GPRS Support Node
GPRS General Packet Radio Service
GSM Global System for Mobile Communications
GW Gateway
HLR Home Location Register
HSS Home Subscriber Server
ICMP Internet Control Message Protocol
IE Information Element
IMSI International Mobile Subscriber Identity
IoT Internet of Things
IP Internet Protocol
LTE Long Term Evolution
M2M Machine-to-Machine
MABR Modify Access Bearer Request
MBR Modify Bearer Request
MBR Maximum Bit Rate
MME Mobility Management Entity
MT Mobile Terminated
MTC Machine Type Communication
NAS Non-Access Stratum
PCRF Policy Control and Charging Rules Function
PDN Packet Data Network
PGW PDN Gateway
PSM Power Saving Mode
RAN Radio Access Network
RAU Routing Area Update
RBS Radio Base Station
RNC Radio Network Controller
RRC Radio Resource Control
SDO Standard Development Organization
SGSN Serving GPRS Support Node
SGW Serving Gateway
SMS Short Message Service
TAU Tracking Area Update
UE User Equipment
UL Uplink
UMTS Universal Mobile Telecommunications System
UTRAN UMTS Terrestrial Radio Access Network WCDMA Wideband Code Division Multiple Access
WiFi Wireless Fidelity

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the term wireless device, wireless terminal, M2M device, MTC device, IoT device and user equipment may be used interchangeably.

General Overview

Figure 1:
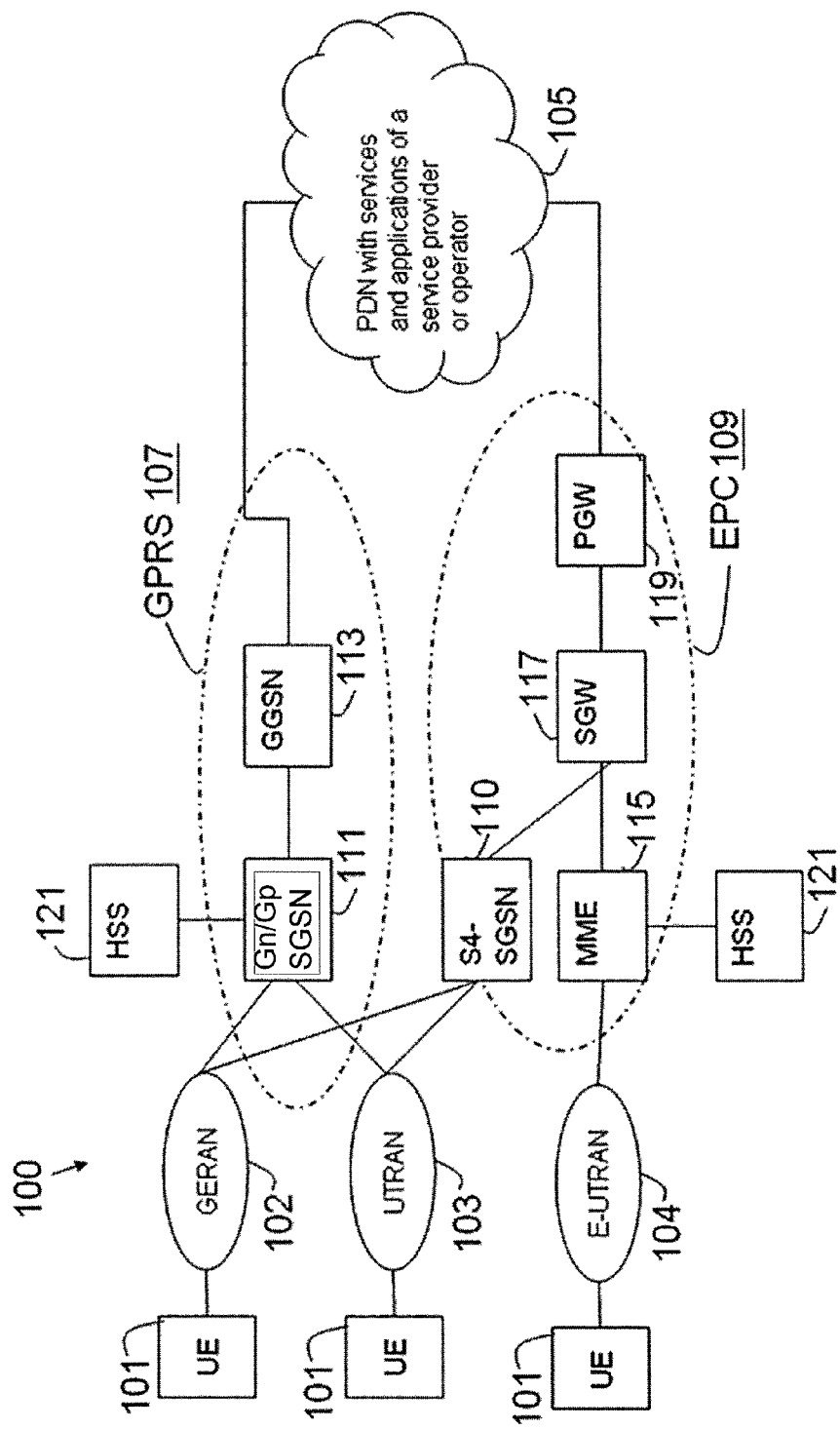
FIG. 1 is an illustrative example of a wireless network.

In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) also known as Gn/Gp-SGSN 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer towards the E-UTRAN 104. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111, the S4-SGSN 110 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

In MTC communications, the user equipment of FIG. 1 may be a M2M device or IoT device. An M2M device or IoT device is typically a device which engages in infrequent communications often powered by a battery. As such, an M2M device and IoT device may be prone to being in a power saving mode such as a power saving state. During such a mode, an application server may attempt to send downlink data.

One method used for sending downlink data to a device in a power saving state is device triggering as specified in 3GPP TS 23.682, clause 5.2, may be used, but has drawbacks in that the application needs to implement the Tsp interface. Device triggering uses the SMS infrastructure of the 3GPP network and may cause unnecessary network load when used at frequent downlink transmissions.

Another method of sending downlink data to a device in a power saving state is the use of polling schemes where the device may poll the application server periodically. This however may require more energy in the device as the radio transmitter needs to be switched on. It also requires more radio resources in the network for transmitting packets uplink and downlink.

A further method of sending downlink data to a device in a power saving state is application level handshaking of device activity periods, as specified by the one M2M SDO. Application handshaking uses a resource that is created by the device in a network server, and allows the device to publish when this device can be reachable. This allows device reachability to be discovered by interested parties before sending downlink data, and by that find the time window when the device is reachable. The problem with this solution is that it is complex, the application server needs to be aware of and have access to the network server where the activity periods of the device are published. It is also difficult to keep the published activity periods updated if the device or the network changes its behavior dynamically. The Extended Long DRX methods are typically in doing that.

Overview of the Example Embodiments

As should be appreciated from the above section, a need exists to provide an efficient means of providing downlink data to a M2M device in a power saving state. The example embodiments presented herein provide downlink data buffering in which the downlink data may be buffered in a SGW or a Gn/Gp-SGSN until the M2M device exits the power saving state and becomes reachable. Thus, the SGW does not need to continuously send additional DDN for any subsequent downlink data. Nor does the application server need to use any frequent repetition when a device does not immediately respond to a transmitted IP packet. Once the M2M device exits the power saving state and, for example, connects to the network after a deferred paging, or for doing a TAU or RAU, any data buffered in the SGW or the Gn/Gp-SGSN will be sent to the M2M device. Thus, the example embodiments presented herein enables very resource efficient communication for a group of IoT devices that uses downlink communication, i.e. communication from the application server on the network side to the device.

The example embodiments provide a changed behavior at the mobility management node (e.g., MME, Gn/Gp-SGSN, and S4-SGSN) after the SGW has sent a Downlink Data Notification (DDN) at downlink data reception in SGW, and a changed behavior at the SGW after the mobility management node has responded to the DDN.

When the mobility management node (e.g., MME, Gn/Gp-SGSN, S4-SGSN) has received the DDN (or the DL data in the Gn/Gp-SGSN case) and detects that the device is using a power saving method (e.g. PSM or Extended long DRX), the mobility management node sets a "Page Pending Flag" (or a deferred paging flag or a cause code or a buffer timer) for the device in the UE context in the mobility management node. It should also be appreciated that the mobility management node may establish an indication that the downlink data will need to be buffered in the SGW. Such an indication may be in the form of a flag, a cause code, a time or an information element.

The mobility management node then returns a Downlink Data Notification Acknowledgement with a Request Accepted cause. The DDN Acknowledgement includes additional information so that the SGW will know that the downlink data shall be buffered. According to some of the example embodiments, the DDN Acknowledgement may also provide an indication that a page is pending and will not be executed immediately. Alternatively a new cause code may be used to indicate that deferred paging will be applied by the mobility management node. The SGW/Gn/Gp-SGSN may then adjust its timers as it may take more time before the device responds to the paging and the SGW receives the Modify Bearer Request (MBR) or Modify Access Bearer Request (MABR) after the device has established its radio data bearers as a result of the paging. This avoids that the SGW/SGSN discards the downlink data too early.

The additional information sent by the mobility management node to SGW may be just a flag or a new or specific cause that tells the SGW/SGSN that the mobility management node will page the device later, for example, as soon as it will be reachable. The additional information may also, or alternatively, comprise time information with an estimation of how long time it will take before the device will be reachable again and may be paged or requested to establish its bearers. The SGW or Gn/Gp-SGSN may use such time information to set or adjust a timer on the buffered downlink data for when it shall be discarded, for example, in case the mobility management node will fail to reach the device with paging or bearer establishment. The timer would then be equal or some amount bigger than the estimated time the mobility management node provides. The mobility management node should typically know how long time it takes before the device is reachable again and can be paged or bearer established, either using the existing Implicit Detach timer and mobile reachable timer, as explained in 3GPP TS 23.401 clause 4.3.5.2, or using DRX values used for the Extended Long DRX, known by mobility management node e.g. by DRX value provided by the device in NAS signaling to the mobility management node. It should be appreciated that a timer in the form of a buffer timer may also be utilized in which such a timer would provide a time for which the downlink data is to be buffered.

It should be appreciated that while the example embodiments are described with the use of a M2M device as example, the example embodiments may also be applied to any wireless device capable of entering into a sleep mode as a means of power saving.

Working Example

Figure 2:
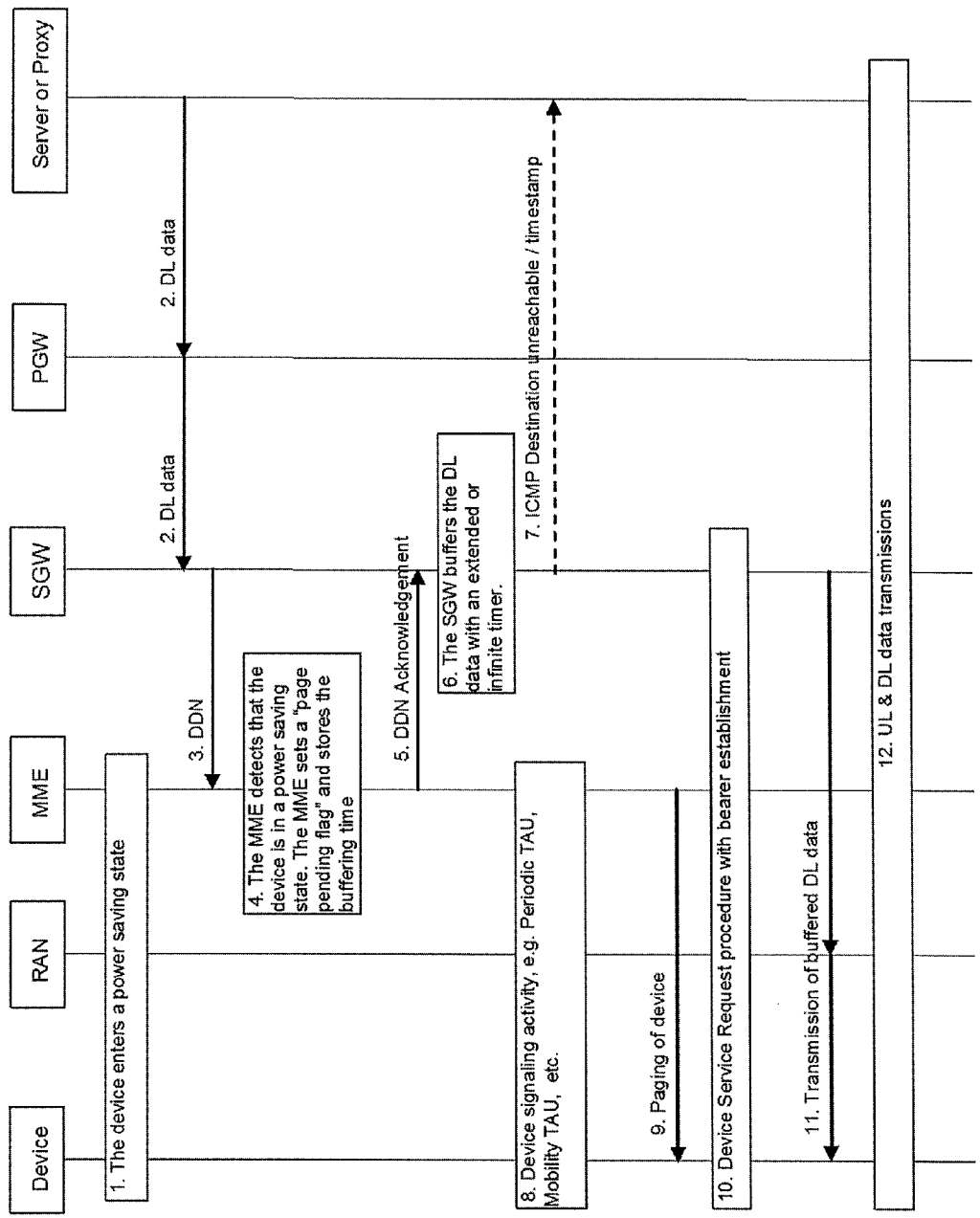
FIG. 2 is an example of a message passing diagram depicting some features of the example embodiments presented herein.

FIG. 2 illustrates a non-limiting working example of deferred paging and buffer management according to the example embodiments presented herein. The actions and messaging depicted in FIG. 2 will be described below according to the corresponding numbering.

1. The device enters a power saving state, e.g. PSM or Extended Long DRX idle
2. A downlink data packet (or data or message) addressed to the device is received in the PDN Gateway and forwarded to the SGW.
3. The SGW sends a Downlink Data Notification to the serving MME.
4. The MME detects that the device is in a power saving state e.g. PSM or Extended Long DRX idle. The MME sets a flag in its MM context that the UE (device) shall be paged and bearers established as soon as possible. This may be a "paging pending" flag or "deferred paging" flag or "paging waiting flag" or a cause code or a buffer timer.
5. The MME returns a DDN Acknowledgement to the SGW with a successful cause value e.g. "Request accepted" or with a new cause value "Request accepted page pending". A buffer time value may be included when the MME estimates the device will be possible to reach when the device is doing Periodic TAU or Mobility TAU. If such a value is included, it may be an indication itself that a paging is pending (i.e. the new cause code may not be needed). Alternatively a specific new IE can be used together with the "Request accepted" cause to indicate that a paging is pending.
6. The SGW buffers the downlink data with an extended or infinite timer. The SGW may use a flag associated to the UE buffer for indicating that paging is pending. If additional data arrives when data is buffered for an extended or infinite time, the SGW will not send any additional DDNs to the MME. At least not until a guard timer has expired. The additional arrived data may also be buffered. If there is not memory for buffering more data, some packets may be discarded, preferably using the First In First Out (FIFO) principle, i.e. oldest data is discarded.

7. The SGW may optionally be configured to send an Internet Control Message Protocol, ICMP, message to the originating node of the DL data. The message may comprise the indication and/or buffer time value provided to the SGW in message 5. The AS or SCS proxy may use this information to adjust its retransmission scheme, for example, to reduce the load on the 3GPP access. Specifically, with this information, the SCS proxy or AS will know not to attempt to contact the wireless device until the end of the buffer time value. A "destination unreachable" or "timestamp" control message may be used to notify the originating node that the device is currently sleeping but that the packet will be delivered as soon as possible. The originating node can use the knowledge of the extended latency to adjust its retransmissions schemes and use a less aggressive retransmission. In case of an ICMP "timestamp" control message a more precise adjustment can be made, e.g. not retransmitting any packet before timeout of the time in the timestamp and then using more frequent retransmissions after the timeout. The application server may use the ICMP information to stop or adjust its retransmission scheme. The application server knows that the device will respond as soon as it wakes up from its power saving state and can be reached.
8. When there is some signaling activity from the device, e.g. periodic Tracking Area Update, the MME checks if the "paging pending flag"/"paging waiting flag"/"paging deferred flag"/"cause code"/"buffer timer" etc is set. When set, the MME may page the device (next step). The MME may alternatively indicate in the TAU Accept message that data bearers need to be established (i.e., IP connectivity). When the device have been notified by paging or data bearer establishment requested, the "paging pending flag"/"paging waiting flag"/"paging deferred flag"/"cause code"/"buffer timer" may be cleared. Alternatively, it is cleared at step 10.
9. The MME may run the paging procedure for the device unless it was possible to request data bearer establishment already in step 8.
10. The data radio bearers and the IP connectivity to the device are established. If the "device activity" detected in step 8 is actually a Service Request, the step 9 may be omitted.
11. When the S1-U is re-established for the device and the SGW has buffered downlink data, the SGW transmits the buffered data to the device.
12. Any UL and DL data transmission may proceed as normal.

Figure 3:
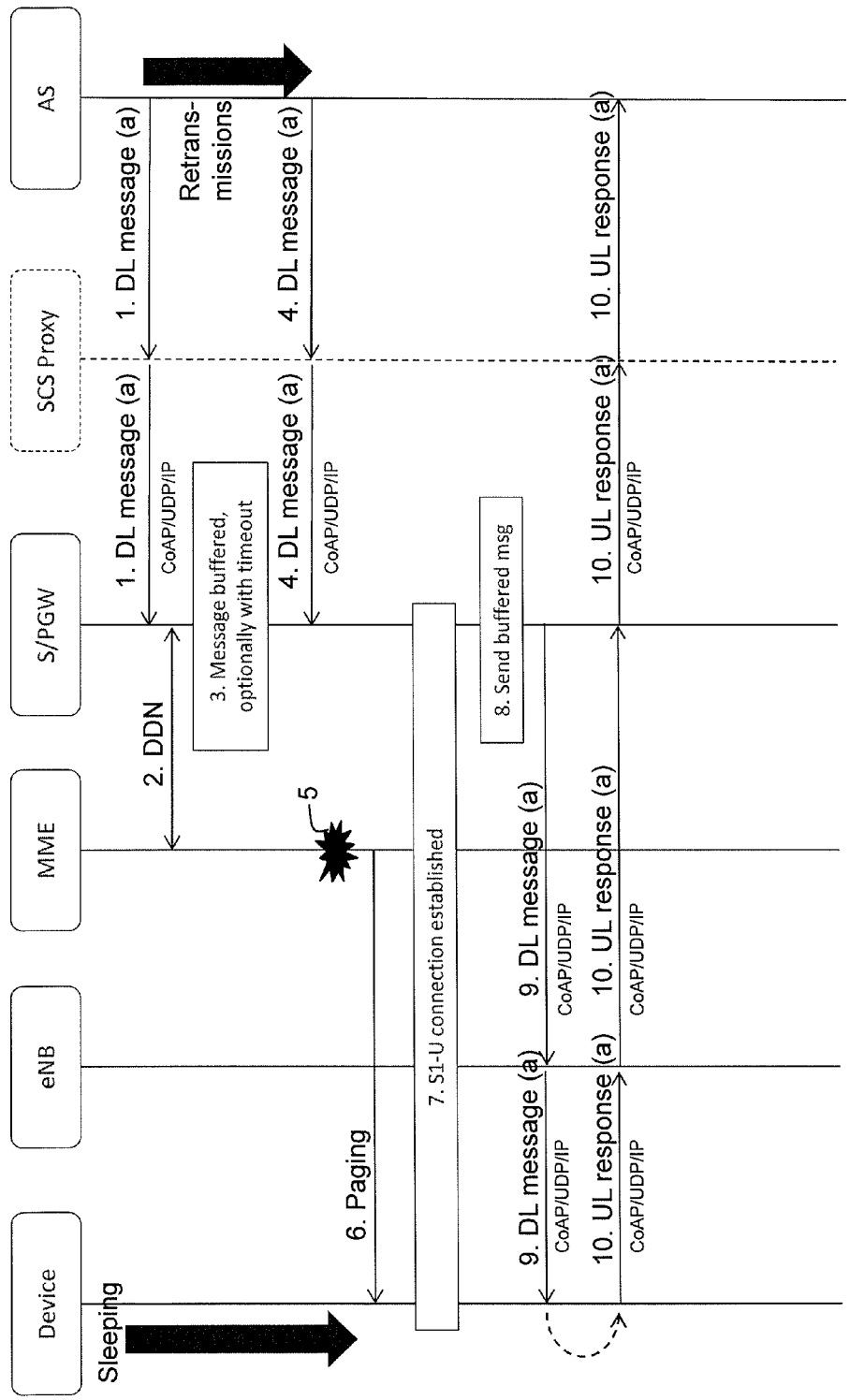
FIGS. 3-4 are additional examples of message passing diagrams depicting some features of the example embodiments presented herein.
Figure 4:
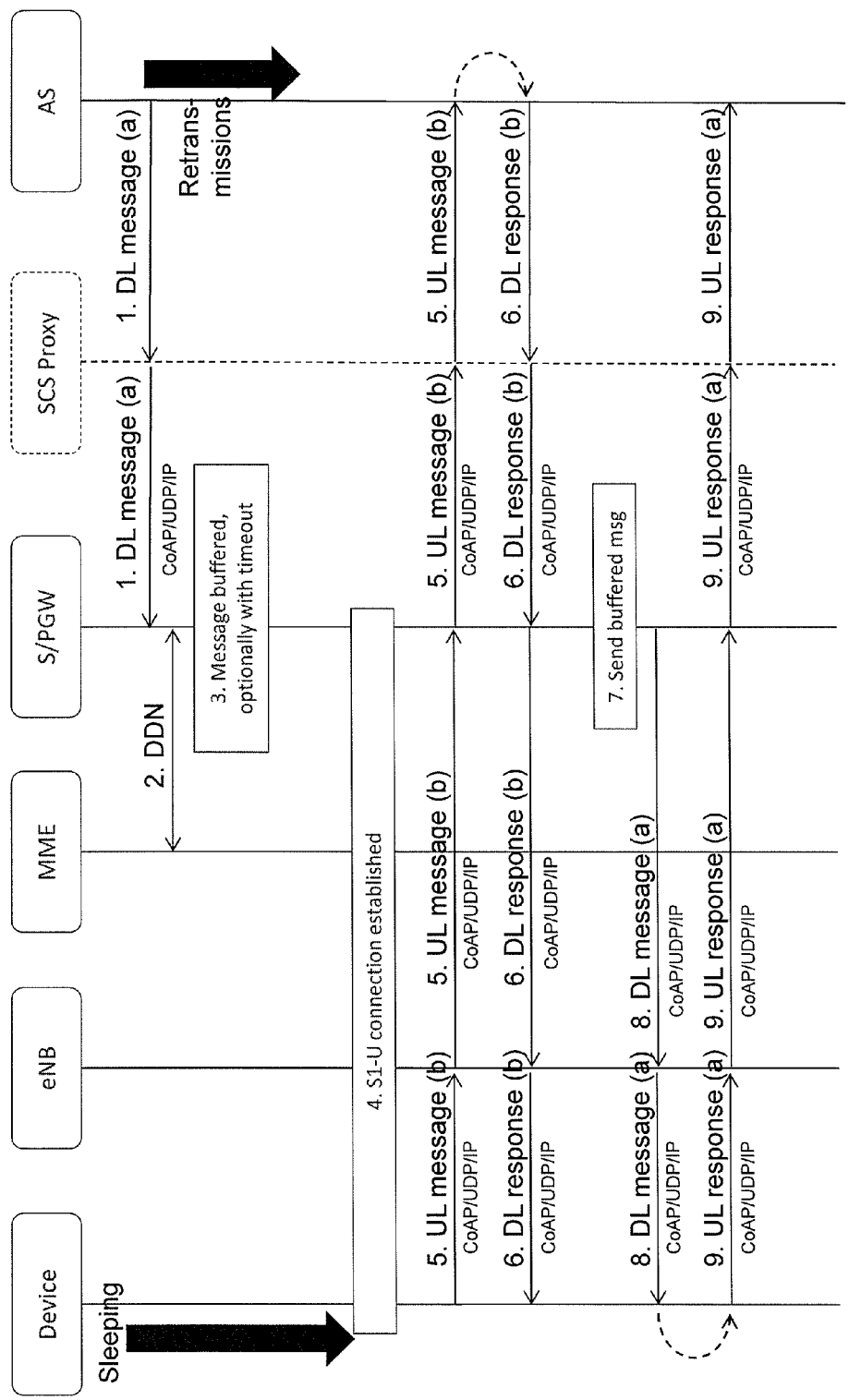

FIGS. 3-4 provide additional working examples of the example embodiments presented herein. It should be appreciated that while the example embodiments illustrated in FIGS. 3-5 has been provided with respect to an LTE system, the example embodiments may be applied to any other wireless system. Furthermore, it should be appreciated that the mobility management node is not limited to a MME but may also be a Gn/Gp-SGSN or S4-SGSN. The SGW may also be a Gn/Gp-SGSN (the user plane part).

FIG. 3 illustrates a working example that may be used when the wireless device is using, for example, an extended DRX power saving mode. First, an application server or SCS proxy sends downlink data for the device which may for example be a CoAP message to the SGW (message 1). Thereafter, the SGW notifies the MME of the downlink data for the wireless device by sending a Downlink Data Notification (DDN) to the MME (message 2). The MME in turn responds with a Downlink Data Notification (DDN) Acknowledgement to the SGW (message 2). According to some of the example embodiments, the DDN Ack comprises an indication that the wireless device is in a sleep or power saving mode. Upon receiving such a notification, the SGW stores the downlink data rather than discarding the data (operation 3).

According to some of the example embodiments, the DDN Ack message further comprises a buffer time value. The buffer time value is an indication to the SGW to extend the buffering including how long the downlink data shall be stored in memory within the SGW. According to some of the example embodiments, the wireless device will use a DRX or extended DRX power saving state. In such embodiments, the buffer time value may be calculated to a time duration in which the wireless device is expected to listen to the paging channel. According to some of the example embodiments, the wireless device will use PSM. According to such example embodiments, the buffer time value may be calculated to a time during in which the wireless device is expected to do a TAU or RAU.

At some time later, the AS or SCS proxy may send additional downlink data to the SGW (message 4). According to some of the example embodiments, this additional data will not trigger the SGW to send an additional DDN message to the MME as the SGW knows that the wireless device is in a sleep or power saving state. Furthermore, the data which was previously saved (operation 3) may or may not be dropped or erased depending available buffer memory or node configuration. According to some of the example embodiments, the subsequent downlink data provided in message 4 may also be saved in memory in a similar manner as the data provided in message 1.

Once the wireless device exits the sleep or power saving state and starts to listen to the paging channel (operation 5), the MME will send a paging notification to the wireless device (message 6). Thereafter, connectivity between the wireless device and the network will be established (operation 7). Once connectivity is established, the SGW will send the buffered downlink data to the wireless device (operation 8). The downlink data is sent to the eNB which forwards the data to the device (message 9). The downlink data may for example be a CoAP message such as indicated by message 9 of FIG. 3. The wireless device may in turn respond by sending uplink data which may for example be a CoAP uplink response message to the SCS proxy or AS (message 10).

FIG. 4 illustrates yet another working example how the buffered downlink data is handled when the device initiates uplink data. A device can leave its power saving state and initiate uplink data (mobile originated data) at any time. Similarly to FIG. 3, in the working example of FIG. 4, downlink data has been sent by an application server or SCS proxy and been buffered in the SGW since the MME detected that the device was using a power saving function e.g. PSM or eDRX (messages 1, 2 and 3).

Figure 5:
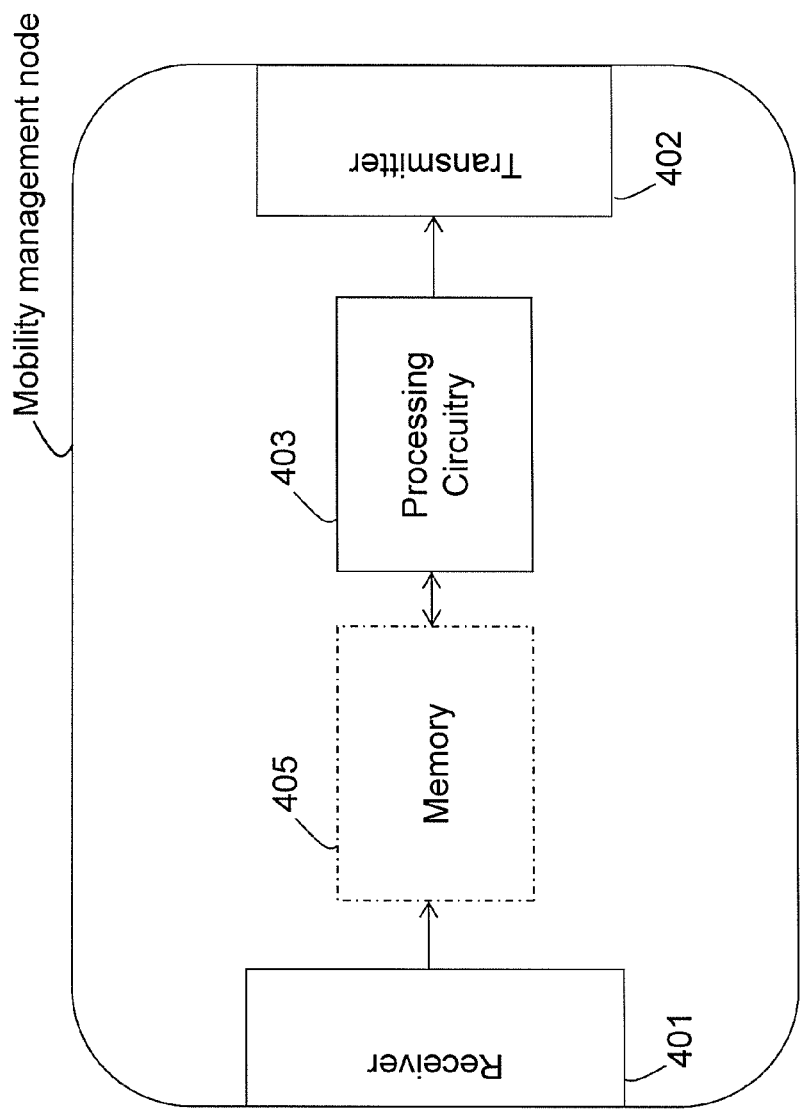
FIG. 5 is an example node configuration of a mobility management node, according to some of the example embodiments.

Sometime later, the wireless device that needs to send uplink data may abort its power saving state and initiate a connection with the network (operation 4). This is the normal procedure where the device sends a Service Request to the MME, which triggers the MME to command the eNB to establish the radio data bearers to the device. The connection with the network may occur before the estimated buffer time has expired. The wireless device may send uplink data to the SCS proxy or AS for example a CoAP uplink message as shown in FIG. 5 (message 5). The SCS proxy or AS may in turn respond by sending downlink data for example a downlink CoAP response to the wireless device (message 6).

The SGW will as soon as the radio bearers and the S1-U connection have been established send the buffered data to the wireless device (operation 7). This may for example be a CoAP downlink message (message 8). It should be appreciated that the SGW may send this information even if an amount of time indicated by the buffer time value has not yet expired. Thereafter, the wireless device may send uplink data for example a CoAP uplink response message to the SCS proxy or AS (message 9).

Example Node Configurations

FIG. 5 illustrates an example node configuration of a mobility management node. It should be appreciated that a mobility management node may be a MME, Gn/Gp-SGSN, or S4-SGSN. The mobility management node may perform downlink data buffering (in the Gn/Gp-SGSN case) according to the example embodiments described herein. The mobility management node may comprise a receiver 401 that may be configured to receive communication data, instructions, and/or messages. The mobility management node may also comprise a transmitter 402 that may be configured to transmit communication data, instructions and/or messages. It should be appreciated that the receiver 401 and transmitter 402 may be comprised as any number of transceiving, receiving, and/or transmitting units, modules or circuitry. It should further be appreciated that the receiver 401 and transmitter 402 may be in the form of any input or output communications port known in the art. The receiver 401 and transmitter 402 may comprise RF circuitry and baseband processing circuitry (not shown).

The mobility management node may also comprise a processing unit or circuitry 403 which may be configured to provide downlink data buffer control and deferred paging management as described herein. The processing circuitry 403 may be any suitable type of computation unit, for example, a microprocessor, digital signal processor (DSP), field programmable gate array (FPGA), or application specific integrated circuit (ASIC), or any other form of circuitry or module. The mobility management node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Figure 6:
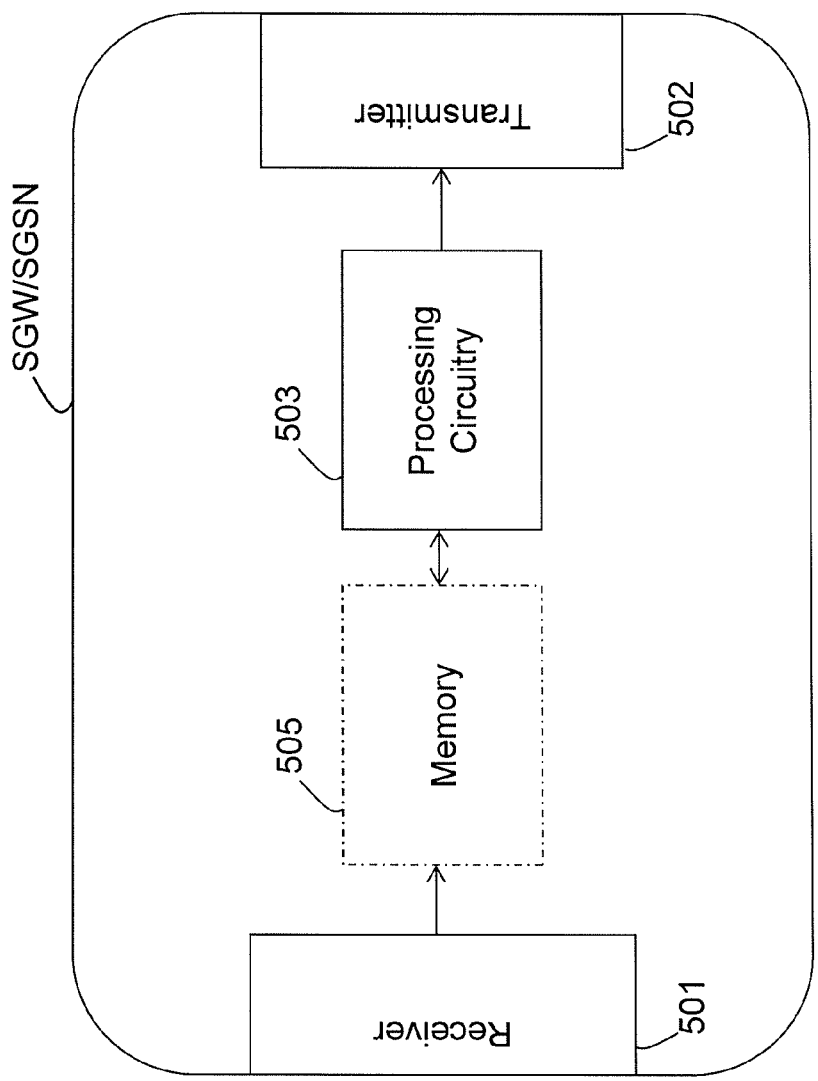
FIG. 6 is an example node configuration of a SGW/Gn/Gp-SGSN, according to some of the example embodiments.

FIG. 6 illustrates an example node configuration of a SGW/Gn/Gp-SGSN. The SGW/Gn/Gp-SGSN may perform downlink data buffering and packet buffering according to the example embodiments described herein. The SGW/Gn/Gp-SGSN may comprise a receiver 501 that may be configured to receive communication data, instructions, and/or messages. The SGW/Gn/Gp-SGSN may also comprise a transmitter 502 that may be configured to transmit communication data, instructions and/or messages. It should be appreciated that the receiver 501 and transmitter 502 may be comprised as any number of transceiving, receiving, and/or transmitting units, modules or circuitry. It should further be appreciated that the receiver 501 and transmitter 502 may be in the form of any input or output communications port known in the art. The receiver 501 and transmitter 502 may comprise RF circuitry and baseband processing circuitry (not shown).

The SGW/Gn/Gp-SGSN may also comprise a processing unit or circuitry 503 which may be configured to provide deferred paging management and packet buffering as described herein. The processing circuitry 503 may be any suitable type of computation unit, for example, a microprocessor, digital signal processor (DSP), field programmable gate array (FPGA), or application specific integrated circuit (ASIC), or any other form of circuitry or module. The SGW/SGSN may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Example Node Operations

Figure 7A:
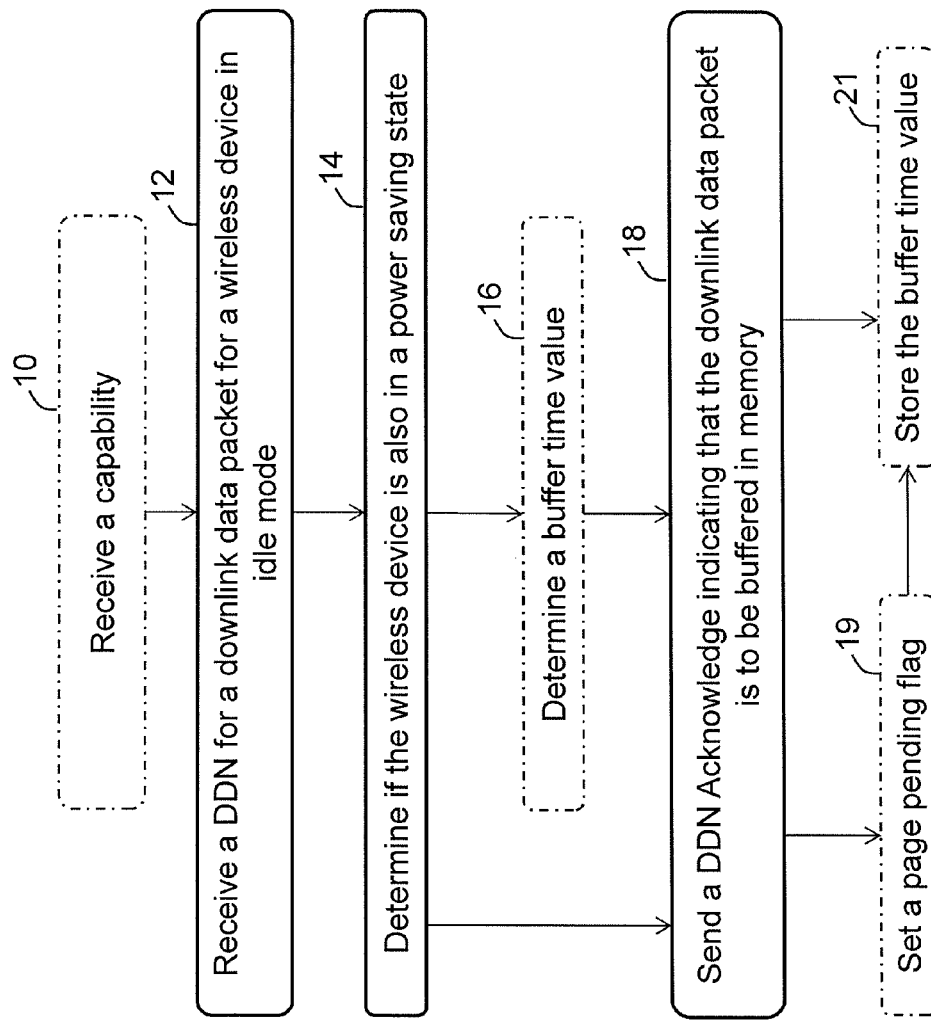
FIG. 7A is a flow diagram depicting example operations performed by the mobility management node of FIG. 5, according to some of the example embodiments.

FIG. 7A is a flow diagram depicting example operations which may be taken by the mobility management node for downlink data buffering as described herein. It should also be appreciated that FIG. 7A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 7B:
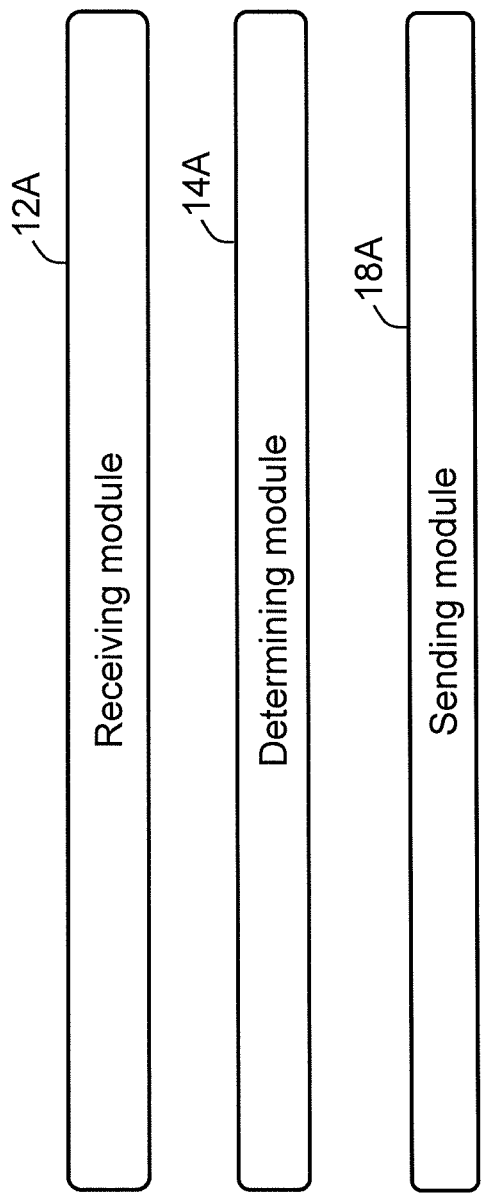
FIG. 7B is a module diagram of the mobility management node of FIG. 5, according to some of the example embodiments.

FIG. 7B is a module diagram depicting modules which may perform at least some of the operations of FIG. 7A.

Example Operation 10

According to some of the example embodiments, the mobility management node is configured to receive 10, from the wireless device or base station serving the wireless device, a deferred paging capability or enhanced buffering capability or sleeping capability. The receiver 401 is configured to receive, from the wireless device or base station serving the wireless device, the deferred paying capability or sleeping capability. Such a capability may also be referred to as a power saving state capability.

It should be appreciated that the mobility management node may be a MME, a Gn/Gp-SGSN, or a S4-SGSN. According to some example embodiments, the wireless device may be a M2M device configured for MTC communications.

According to the some of the example embodiments, the mobility management node may receive the deferred paging or sleeping capability which provides an indication as to whether or not deferred paging and the buffering of downlink can be applied for the wireless device as described herein. According to some of the example embodiments, the mobility management node may be further configured to send the deferred paging capability or sleeping capability to the SGW, or any other node in the network.

Operation 12

The mobility management is configured to receive 12, from the SGW, a DDN for a downlink data packet for a wireless device in an idle mode. The receiver 401 is configured to receive, from the SGW, the DDN for the downlink data packet for the wireless device in idle mode. The receiving module 12A is configured to perform operation 12.

Operation 14

The mobility management node is further configured to determine 14 if the wireless device is also in a power saving state. The processing 403 is configured to determine if the wireless device is also in a power saving state. The determining module 14A is configured to perform operation 14. According to some of the example embodiments, the power saving state may be a PSM, DRX, extended DRX idle mode or extended DRX connected mode.

According to some of the example embodiments, the determining if the wireless device is in a power saving state may be based on any one or more of a duration of time in which the wireless device is in a power saving state (e.g., a total time), a time remaining in a power saving state (e.g., a time remaining from the total time), a subscribed APN, subscription parameters, a received power saving schedule (e.g., a scheduled time), user equipment capability parameters, and a configuration within the mobility management node.

Example Operation 16

According to some of the example embodiments, the mobility management node is further configured to determine 16 a buffer time value. The buffer time value represents a time in which the downlink data packet is to be buffered in the SGW or Gn/Gp-SGSN. The processing circuitry 403 is configured to determine the buffer time value.

It should also be appreciated that this value may be used to represent the time in which the mobility management node is expecting the wireless device to have woken up from its power saving state and a connection with it have been established. The mobility management node should typically know how long time it takes before the device is reachable again and can be paged or bearer established, either using the existing Implicit Detach timer and mobile reachable timer, as explained in 3GPP TS 23.401 clause 4.3.5.2, or using DRX values used for the Extended Long DRX, known by mobility management node e.g. by DRX value provided by the device in NAS signaling to the mobility management node. Thereafter, the SGW/Gn/Gp-SGSN may use the buffer time value as the time the DL packet is buffered or calculate an appropriate buffer time for the DL packet.

According to some of the example embodiments, the determining of the buffer time value may be based on any one or more of a duration of time in which the wireless device is in a power saving state (e.g., a total time), a time remaining in a power saving state (e.g., a time remaining from the total time), a subscribed APN, subscription parameters, a received power saving schedule (e.g., a scheduled time), user equipment capability parameters, and a configuration within the mobility management node.

It should be appreciated that the subscribed APN and/or the subscription parameters may be pre-configured in the mobility management node, or obtained by the mobility management node from, for example, the HSS. The received power saving schedule, for example, the time periods or time in which the wireless device is expected to be in a power saving state (e.g., PSM or eDRX), may be obtained by the mobility management node from the device via a RAU or TAU request or from subscription parameters.

According to some of the example embodiments, the buffer time value may also be determined by evaluating a remaining time of the current power saving state, for example, against a threshold value. It should further be appreciated that the buffer time value may be a configured value within the mobility management node.

Operation 18

The mobility management node is further configured to send, to the SGW, a DDN Acknowledge with a cause code or flag of buffer time value indicating that the downlink data packet is to be buffered in memory. The transmitter 402 is configured to send, to the SGW, the DDN Acknowledge with the cause code or flag or buffer time value indicating that the downlink data packet is to be buffered in memory. The buffer time value is described in relation to example operation 16. The sending module 18A is configured to perform operation 18.

It should be appreciated that according to some of the example embodiments, it may be the SGW or the SGSN which determines the buffer time value, in such example embodiments, the buffer time value need not be comprised in the DDN Acknowledgement.

Example Operation 19

According to some of the example embodiments, the mobility management node is further configured to set 19 a page pending flag and store the buffer time value for how long the buffered downlink data is expected to be buffered in the SGW. This indicates the need to establish a S1-U connection for buffered downlink data to be delivered, by paging the device when it becomes reachable or by requesting establishment of radio bearers at TAU/RAU. The processing circuitry 403 is configured to set the page pending flag and store the buffer time value.

Example Operation 21

According to some of the example embodiments, the mobility management node is further configured to store 21 the buffer time value in a mobility management node. The buffer time value indicates that data is being buffered and paging is needed for the wireless device to establish an S1-U connection for buffered downlink data to be delivered. The processing circuitry 403 is configured to store the buffer time value in the mobility management node. This example embodiment is further described in relation to example embodiment 19.

Figure 8A:
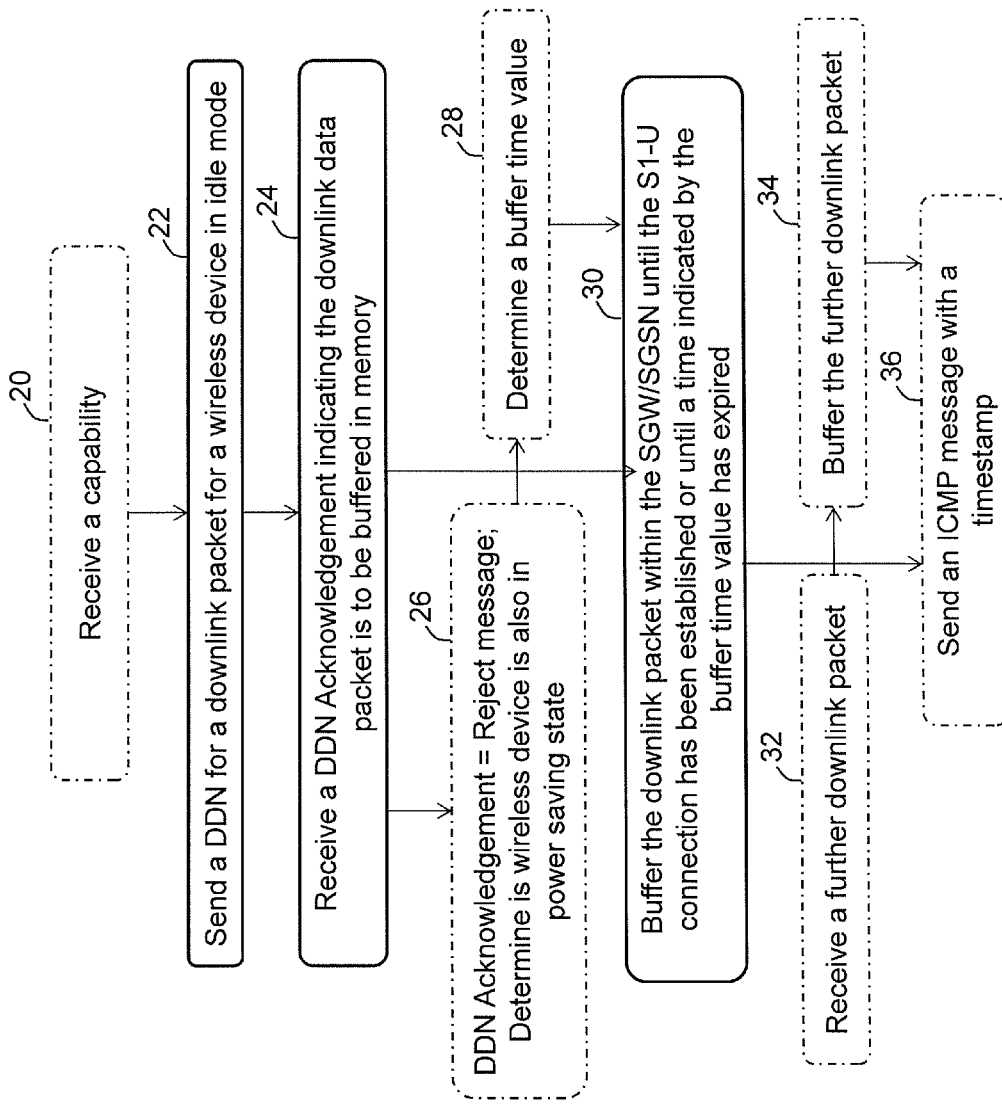
FIG. 8A is a flow diagram depicting example operations performed by the SGW/Gn/Gp-SGSN of FIG. 6, according to some of the example embodiments.

FIG. 8A is a flow diagram depicting example operations which may be taken by the SGW for control of packet buffering and deferred paging management as described herein. It should also be appreciated that FIG. 8A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 8B:
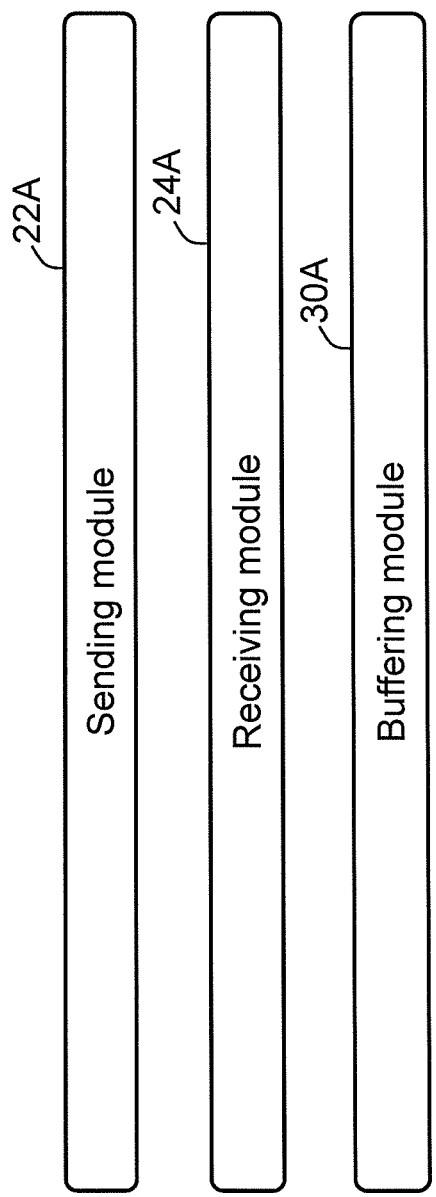
FIG. 8B is a module diagram of the SGW/Gn/Gp-SGSN of FIG. 6, according to some of the example embodiments.

FIG. 8B is a module diagram depicting modules which may perform at least some of the operations of FIG. 8A.

Example Operation 20

According to some of the example embodiments, the SGW is configured to receive 20, from the mobility management node, a deferred paging capability or enhanced buffering capability or sleeping capability. The receiver 501 is configured to receive, from the mobility management node, the deferred paying capability or enhanced buffering capability or sleeping capability. Such a capability may also be referred to as a power saving state capability.

It should be appreciated that the mobility management node may be a MME, a Gn/Gp-SGSN, or a S4-SGSN. According to some example embodiments, the wireless device may be a M2M device configured for MTC communications.

According to the some of the example embodiments, the deferred paging or enhanced buffering or sleeping capability provides an indication as to whether or not deferred paging and the buffering of downlink data can be applied for the wireless device as described herein.

Operation 22

The SGW is further configured to send 22, to a mobility management node, a DDN for a downlink data packet for a wireless device in an idle mode. The transmitter 502 is configured to send, to the mobility management node, the DDN for the downlink data packet for the wireless device in idle mode. The sending module 22A is configured to perform operation 22.

Operation 24

The SGW is also configured to receive 24, from the mobility management node, a DDN Acknowledgement comprising a flag or cause code or buffer time value indicating that the downlink data packet is to be buffered in memory. The receiver 501 is configured to receive, from the mobility management node, the DDN Acknowledgement comprising the flag or cause code or buffer time value indicating that the downlink data packet is to be buffered in memory. The receiving module 24A is configured to perform operation 24.

Example Operation 26

According to some of the example embodiments, the DDN Acknowledgement is a DDN reject message. In such example embodiments, the method further comprises determining 26 if the wireless device is also in a power saving state. The processing circuitry 503 is configured to determine if the wireless device is also in a power saving state.

According to some of the example embodiments, the determining of whether or not the wireless device is also in a power saving state may be based on any one or more of a duration of time in which the wireless device is in a power saving state (e.g., a total time), a time remaining in a power saving state (e.g., a time remaining from the total time), a subscribed APN, subscription parameters, a received power saving schedule (e.g., a scheduled time), user equipment capability parameters, and a configuration within the SGW node.

According to some of the example embodiments, the DDN Acknowledgement may comprise the buffer time value. The buffer time value represents a time in which the downlink data packet is to be buffered in the SGW or Gn/Gp-SGSN.

According to some of the example embodiments, it may be the SGW or the user plane part of Gn/Gp-SGSN that determines that extended buffering is to be used instead of the mobility management node.

Example Operation 28

According to some of the example embodiments, the SGW is further configured to determine 28 a buffer time value. The buffer time value represents a time in which the downlink data packet is to be buffered in the SGW. The processing circuitry 503 is configured to determine the buffer time value.

It should be appreciated that this value may be used to represent the time in which the SGW node is expecting the wireless device to have woken up from its power saving state and a connection with it has been established. Thereafter, the SGW may use the buffer time value as the time the downlink data packet is buffered or calculate an appropriate buffer time for the downlink data packet.

According to some of the example embodiments, the determining of the buffer time value may be based on any one or more of a duration of time in which the wireless device is in a power saving state (e.g., a total time), a time remaining in a power saving state (e.g., a time remaining from the total time), a subscribed APN, subscription parameters, a received power saving schedule (e.g., a scheduled time), user equipment capability parameters, and a configuration within the SGW node.

It should be appreciated that the subscribed APN and/or the subscription parameters may be pre-configured in the SGW, or obtained from the mobility management node, or obtained from, for example, the HSS. The received power saving schedule, for example, represents the time periods or time in which the wireless device is expected to be in a power saving state (e.g., PSM or eDRX).

Operation 30

The SGW or Gn/Gp-SGSN is further configured to buffer 30 the downlink data packet within the SGW or Gn/Gp-SGSN until the connection with the wireless device has been established for the downlink data packet to be delivered to the wireless device or until a time indicated by the buffer time value has expired. The processing circuitry 503 is configured to buffer the downlink data packet within the SGW or Gn/Gp-SGSN until the connection with the wireless device has been established for the downlink data packet to be delivered to the wireless device or until a time indicated by the buffer time value has expired. The buffering module 30A is configured to perform operation 30.

Example Operation 32

According to some of the example embodiments, the downlink data packet is a first downlink data packet and the wireless device is in a power saving state during the buffering of the first downlink data packet. In such example embodiments, the SGW or Gn/Gp-SGSN is further configured to receive 32, from a PGW or GGSN, a further downlink data packet for the wireless device. The wireless device is in a power saving state. The receiver 501 is configured to receive, from the PGW or the GGSN, the further downlink data packet.

According to this example embodiment, the SGW will not send any further DDNs to the mobility management node since there are already packets buffered for the wireless device in the SGW.

Example Operation 34

According to some of the example embodiments, the SGW or Gn/Gp-SGSN is further configured to buffer 34 the further downlink data packet. The processing circuitry 503 is configured to buffer further downlink data packet.

According to some of the example embodiments, both the further and first packets may be buffered. Alternatively, the first packet may be discarded in favor of the further packet. According to some of the example embodiments, the discarding of the downlink data packets follows a first in first out scheduling method.

According to some of the example embodiments, the discarding of the downlink data packets is provided according to a Constrained Application Protocol (CoAP) and information present in the CoAP protocol header e.g. message ID and source end-point.

According to some of the example embodiments, the discarding of the downlink data packets is provided according to an Internet Protocol (IP) and information present in the IP protocol header e.g. source IP address.

According to some of the example embodiments, both the first and the further downlink data packet are buffered.

Example Operation 36

According to some of the example embodiments, the SGW or SGSN is also configured to send 36, to the source host of the received downlink data packet e.g. an application server, a notification of a buffered downlink data packet. The notification comprises the buffer time value and/or a time stamp indicating a time for which the downlink data packet was buffered. The transmitter 502 is configured to send, to the source host of the received downlink data packet e.g. an application server, the notification of the buffered downlink data packet.

According to some of the example embodiments, the notification is an Internet Control Message Protocol, ICMP, the control message being a 'destination unreachable device sleeping' message with a 'timestamp' parameter included informing about the remaining buffer time of buffered packet.

According to some of the example embodiments, the SGW or Gn/Gp-SGSN, may send the destination unreachable device sleeping notification to the application server so the server may become aware of the buffered packet and will therefore stop repeating the downlink data packet or reduce the repetition frequency or adjust the repetition frequency according to the provided timestamp.

It should be appreciated that according to some of the example embodiments, it is the mobility management node which decides to use the deferred paging or extended buffering as needed. Examples of when this is needed are, PSM is used by the device (i.e. in the specific moment when the DDN arrives), Extended long DRX is used, or just if the device doesn't respond to paging and the mobility management node must respond to the SGW before the DDN from the SGW times out (default the SGW has a retransmission timer of 2 seconds before the SGW retransmits). The M2M or wireless device may be slow in responding e.g. if it is using a very low bitrate connection (sometimes data needs to be repeated 100 of times before sufficient energy has been transmitted for the receiver to be able to decode the message without any bit-errors). This may take several seconds in worst case.

According to other example embodiments, it is the SGW or user plane part of the Gn/Gp-SGSN which determines that the extended buffering needs to be utilized, for example, in the presence of a DDN reject message from the mobility management node.

According to some of the example embodiments, the time value transferred from mobility management node to SGW could either be a time value that the SGW shall use as time out of the buffered data, or a time value when the mobility management node expects that the device should have responded to paging. The latter is used by the SGW to calculate an appropriate buffer timeout value (probably a bit bigger than expected time).

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a Serving Gateway, SGW, or a Gn/Gp-Serving General Packet Radio Service Support Node, Gn/Gp-SGSN, for downlink data buffering in a wireless communications network, the method comprising:
   sending, to a mobility management node, a Downlink Data Notification, DDN, for a downlink data packet for a wireless device in an idle mode;
   receiving, from the mobility management node, a DDN Acknowledgement comprising one or more of a flag, a cause code and a buffer time value indicating the downlink data packet is to be buffered in memory;
   buffering the downlink data packet within the SGW or Gn/Gp-SGSN until a connection with the wireless device has been established for the downlink data packet to be delivered to the wireless device or until a time indicated by the buffer time value has expired; and
   sending, to an application server, an Internet Control Message Protocol, ICMP, control message, said message comprising a timestamp indicating a time remaining for which the downlink data will be buffered.

2. The method of claim 1, wherein the DDN Acknowledgement is a DDN reject message, the method further comprising determining if the wireless device is also in a power saving state.

3. The method of claim 1, further comprising determining the buffer time value, the buffer time value representing a time in which the downlink data packet is to be buffered in the SGW or Gn/Gp-SGSN.

4. The method of claim 3, wherein the determining if the wireless device is in a power saving state and/or the determining the buffer time valve is based on one or more of:
   a duration of time the wireless device is in a power saving state;
   a time remaining in a power saving state;
   a subscribed Access Point Name, APN;
   subscription parameters;
   a received power saving schedule;
   user equipment capability parameters; and
   a configuration within the SGW or SGSN node.

5. The method of claim 1, wherein the downlink data packet is a first downlink data packet and wherein the wireless device is in a power saving state during the buffering of the first downlink data packet, the method further comprising:
   receiving, from a Packet Data Network Gateway, PGW, a further downlink data packet for the wireless device, wherein the wireless device is in the power saving state; and
   buffering the further downlink data packet.

6. The method of claim 1, further comprising receiving, from the mobility management node, a deferred paging capability or sleeping capability.

7. A Serving Gateway, SGW, or a Gn/Gp-Serving General Packet Radio Service Support Node, Gn/Gp-SGSN, for downlink data buffering in a wireless communications network, the SGW or Gn/Gp-SGSN comprising:
   a transmitter;
   a receiver; and
   processing circuitry coupled to the transmitter and the receiver, wherein the processing circuitry is configured to:
   employ the transmitter to transmit, to a mobility management node, a Downlink Data Notification, DDN, for a downlink data packet for a wireless device in an idle mode,
   receive via the receiver, from the mobility management node, a DDN Acknowledgement comprising one or more of a flag, a cause code and a buffer time value indicating the downlink data packet is to be buffered in memory,
   buffer the downlink data packet within the SGW or Gn/Gp-SGSN until the connection with the wireless device has been established for the downlink data packet to be delivered to the wireless device or until a time indicated by the buffer time value has expired, and
   employ the transmitter to transmit, to an application server, an Internet Control Message Protocol, ICMP, control message, said message comprising a timestamp indicating a time remaining for which the downlink data will be buffered.

8. The SGW or Gn/Gp-SGSN of claim 7, wherein the DDN Acknowledgement is a DDN reject message, the processing circuitry is further configured to determine if the wireless device is also in a power saving state.

9. The SGW or Gn/Gp-SGSN of claim 7, wherein the processing circuitry is further configured to determine a buffer time value, the buffer time value representing a time in which the downlink data packet is to be buffered in the SGW or Gn/Gp-SGSN.

10. The SGW or Gn/Gp-SGSN of claim 9, wherein the processing circuitry is further configured to determine if the wireless device is in the sleep mode and/or to determine the buffer time value based onone or more of:
   a duration of time the wireless device is in a power saving state;
   a time remaining in a power saving state;
   a subscribed Access Point Name, APN;
   subscription parameters;
   a received power saving schedule;
   user equipment capability parameters; and
   a configuration within the SGW or Gn/Gp-SGSN node.

11. The SGW or Gn/Gp-SGSN of claim 7, wherein the downlink data packet is a first downlink data packet and wherein the wireless device is in a power saving state during the buffering of the first downlink data packet:
   the processing circuitry is further configured to:
   receive via the receiver, from a Packet Data Network Gateway, PGW, a further downlink data packet for the wireless device, wherein the wireless device is in the power saving state, and
   buffer the further downlink data packet.

12. The SGW or Gn/Gp-SGSN of claim 7, wherein the processing circuitry is further configured to:
   receive via the receiver, from the mobility management node, a deferred paging capability or sleeping capability.

* * * * *